United States Patent
Gatchell et al.

[19]

[11] Patent Number: 6,036,757
[45] Date of Patent: Mar. 14, 2000

[54] PORTABLE ROOM AIR PURIFIER

[75] Inventors: Stephen M. Gatchell, Warwick, R.I.; Zhiwei Xu, El Paso, Tex.

[73] Assignee: Honeywell Inc., Minneapolis, Minn.

[21] Appl. No.: 09/113,606

[22] Filed: Jul. 10, 1998

[51] Int. Cl.[7] ................................. B01D 46/46
[52] U.S. Cl. ................................. 96/424; 95/25; 95/26
[58] Field of Search ............................ 55/467, 472, 473, 55/DIG. 34, 385.2; 95/25, 26; 96/424, 417, FOR 167, FOR 170

[56] References Cited

U.S. PATENT DOCUMENTS

| | | | |
|---|---|---|---|
| 4,786,295 | 11/1988 | Newman et al. | 96/424 |
| 5,379,254 | 1/1995 | Maly et al. | 96/424 |
| 5,772,732 | 6/1998 | James et al. | 95/25 |
| 5,810,908 | 9/1998 | Gray et al. | 95/25 |

FOREIGN PATENT DOCUMENTS

| | | | |
|---|---|---|---|
| 61-33210 | 2/1986 | Japan | 96/FOR 167 |
| 62-68513 | 3/1987 | Japan | 96/FOR 167 |
| 63-97212 | 4/1988 | Japan | 96/FOR 167 |
| 63-147513 | 6/1988 | Japan | 96/FOR 167 |
| 63-147514 | 6/1988 | Japan | 96/FOR 167 |
| 2-48013 | 2/1990 | Japan | 96/FOR 170 |
| 3-56117 | 3/1991 | Japan | 96/FOR 170 |
| 3-143518 | 6/1991 | Japan | 96/FOR 167 |
| 3-221113 | 9/1991 | Japan | 96/FOR 167 |
| 5-076713 | 3/1993 | Japan | 96/FOR 170 |

*Primary Examiner*—Duane S. Smith
*Attorney, Agent, or Firm*—John E. Toupal; Harolf G. Jarcho

[57] ABSTRACT

A portable air purifier including a housing defining an air inlet, an air outlet and an air flow passage extending therebetween; a filter mechanism disposed to filter air circulating through the flow passage; and a fan retained by the housing and activatable to draw air through the air inlet, move air through the flow passage and filter mechanism, and discharge air through the air outlet. An electrically powered drive mechanism is energizable to activate the fan and a control system including a processor monitors and records elapsed time data during periods in which the fan is activated to move air.

22 Claims, 8 Drawing Sheets

PORTABLE ROOM AIR PURIFIER

BACKGROUND OF THE INVENTION

This invention relates generally to air purifiers and, more particularly, to a portable room air purifier providing filter use information.

There is an ever increasing need to provide clean air environments both at home and in the work place. Especially in urban areas where pollutant levels are in excess of those recommended for good health, it is necessary to upgrade living and work environments by removing harmful contaminants from the air.

Airborne pollutants contribute to respiratory infections and illnesses and can be especially damaging to individuals with respiratory problems including allergies or from Asthma. Symptoms of high pollutant levels are burning eyes, nose and throat irritations, headaches, dizziness, coughing and sneezing. Individuals are constantly inhaling particles of dust, smoke, pollen, mold spores, acids, bacteria, viruses, animal hair, soot, and harmful chemicals.

In an effort to provide some relief from airborne pollutants, many offices and homes utilize central filtering systems to remove particles from the air. Unfortunately, such centralized systems, which are economically available, do not remove more than approximately 80–85% of the particles in the air and are only effective on particles which are approximately one micron or larger.

The need to have substantially purified air has resulted in the creation of special filter elements which are defined as HEPA filters. HEPA stands for High Efficiency Particulate Air filters which by, federal standard, are filters with a minimum efficiency of 99.9%. The industry defines HEPA filters as those filters which are efficient in removing 99.97% of airborne particles of a size of 0.3 micron or larger.

Although such HEPA filter elements were originally designed for use in ultra clean environments including laboratories, electronic and biologically clean rooms, hospitals and the like, such filters have been used in portable structures which may be utilized in individual room environments. U.S. Pat. No. 5,435,817 discloses such a portable room air purifier having a housing in which a filter element is positioned so as to be intermediate an air inlet and an air outlet and wherein a fan is driven by a motor so as to urge air inwardly through the inlet and discharge the air towards the outlet. The portable room air purifier further includes at least one scroll which is oriented so as to direct air from the fan generally tangently with respect to the axis of the fan through a scroll discharge opening. A deflector is mounted in spaced relationship with respect to the discharge opening and the deflector tapers inwardly relative to the scroll to thereby define an open passageway through which air is directed as it is exhausted through the air outlet. The disclosed filter structure provides improved uniform filtered air distribution with a relatively compact device. However, a need exists for even more efficient portable room air purifiers.

Clogging of filter elements is one factor which adversely impacts the efficiency of an air purifier. Consequently, timely replacement of filter elements is critical to prolonged efficient operation. That problem is addressed in U.S. Pat. No. 4,629,482 which discloses a portable air purifier providing an audible indication of a clogged filter condition. However, the disclosed indicator system exhibits certain undesirable characteristics such as annoying noise generation and unreliable performance. Also known are battery operated timer systems for indicating a clogged filter condition. Such systems time continuously and, therefore, can be unreliable when the device experiences periods of inactivity.

The object of this invention, therefore, is to provide a portable room air purifier with improved operating efficiency over an extended period of use.

SUMMARY OF THE INVENTION

The invention is a portable air purifier including a housing defining an air inlet, an air outlet and an air flow passage extending therebetween; a filter mechanism disposed to filter air circulating through the flow passage; and a fan retained by the housing and activatable to draw air through the air inlet, move air through the flow passage and filter mechanism, and discharge air through the air outlet. An electrically powered drive mechanism is energizable to activate the fan and a control system including a processor monitors and records elapsed time data during periods in which the fan means is activated to move air. By recording only during active periods, the control system provides an accurate measurement of filter use.

According to one feature of the invention, the control system further includes an elapsed time indicator for indicating a given value of elapsed time data. The indicator alerts a user of a filter replacement requirement.

According to another feature of the invention, the processor includes a clock responsive to energization of the drive to provide the elapsed time data and the control system further includes a reset for resetting the clock. The reset permits establishment of a new timing period after filter replacement.

According to an additional feature of the invention, the elapsed time indicator is a lamp energized by the processor in response to the given value of elapsed time data. The lamp provides a user with a prominent indication of a filter replacement requirement.

According to yet another feature of the invention, the drive mechanism is a multiple speed motor rotatably coupled to the fan and the control system further includes a plurality of speed selectors, each operable to select a different speed of the motor; and the recorded elapsed time data is variably dependent on the selected speed of the motor. The recording of speed dependent time data facilitates more accurate prediction of a clogged filter condition.

According to an important feature of the invention, the processor records a total elapsed time value equal to the sum of elapsed time periods during which the motor is energized at each selected speed and each elapsed time period is weighted in direct dependence on motor speed during that time period. This feature provides a highly reliable measurement of anticipated filter contamination.

According to another important feature of the invention, the control system further includes a remaining life indicator for indicating a predetermined time period equal to a difference between a current value of elapsed time data and an anticipated original effective life expectancy of the filter mechanism. The remaining life indicator provides a user with an estimate of remaining effective filter life.

According to yet another important feature of the invention, the filter mechanism includes a first filter and a second filter arranged in series so as to sequentially filter air circulating through the flow passage, and the control system includes a first elapsed time indicator for indicating one value of elapsed time data for the first filter, and a second elapsed time indicator for indicating another value of elapsed time data for the second filter. The provision of specific elapsed time data for each of the first and second filters facilitates timely replacement of such filters having different useful life times.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
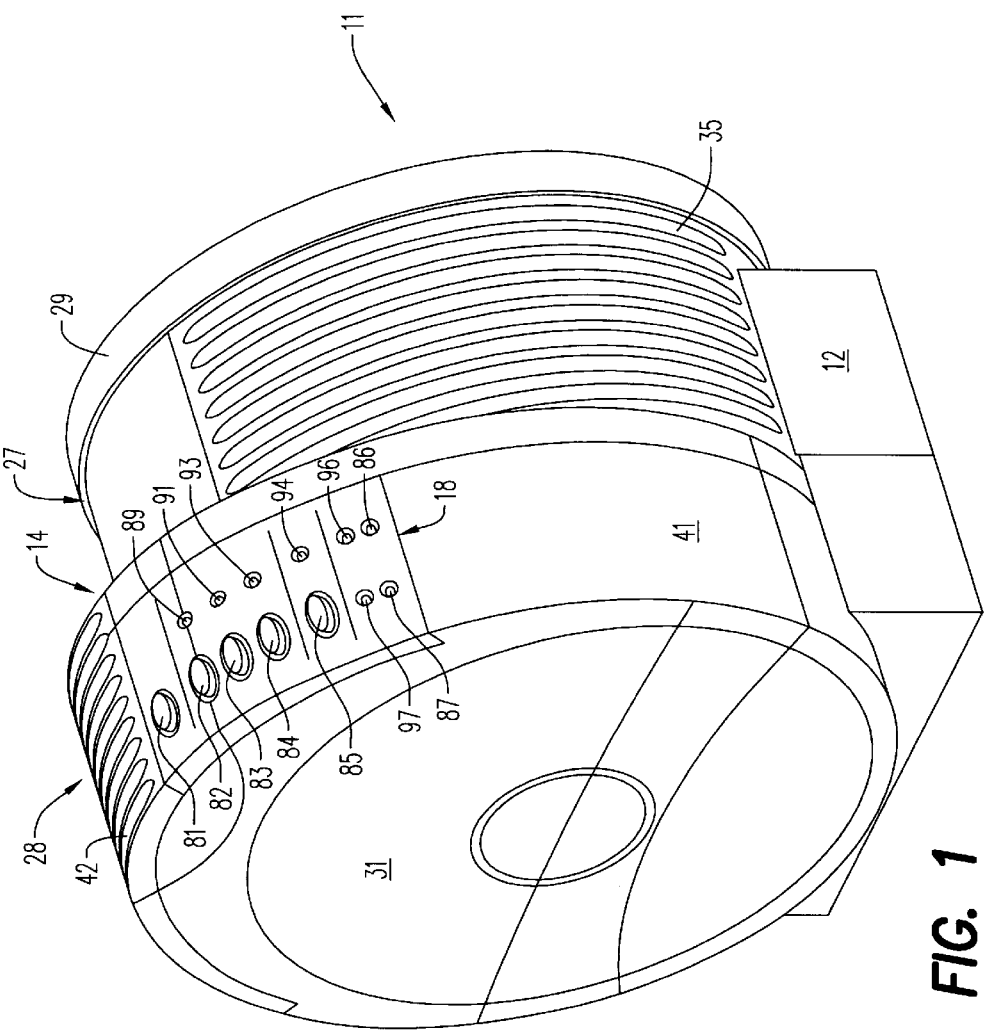
FIG. 1 is a front left perspective view of an air purifier according to the invention.
Figure 2:
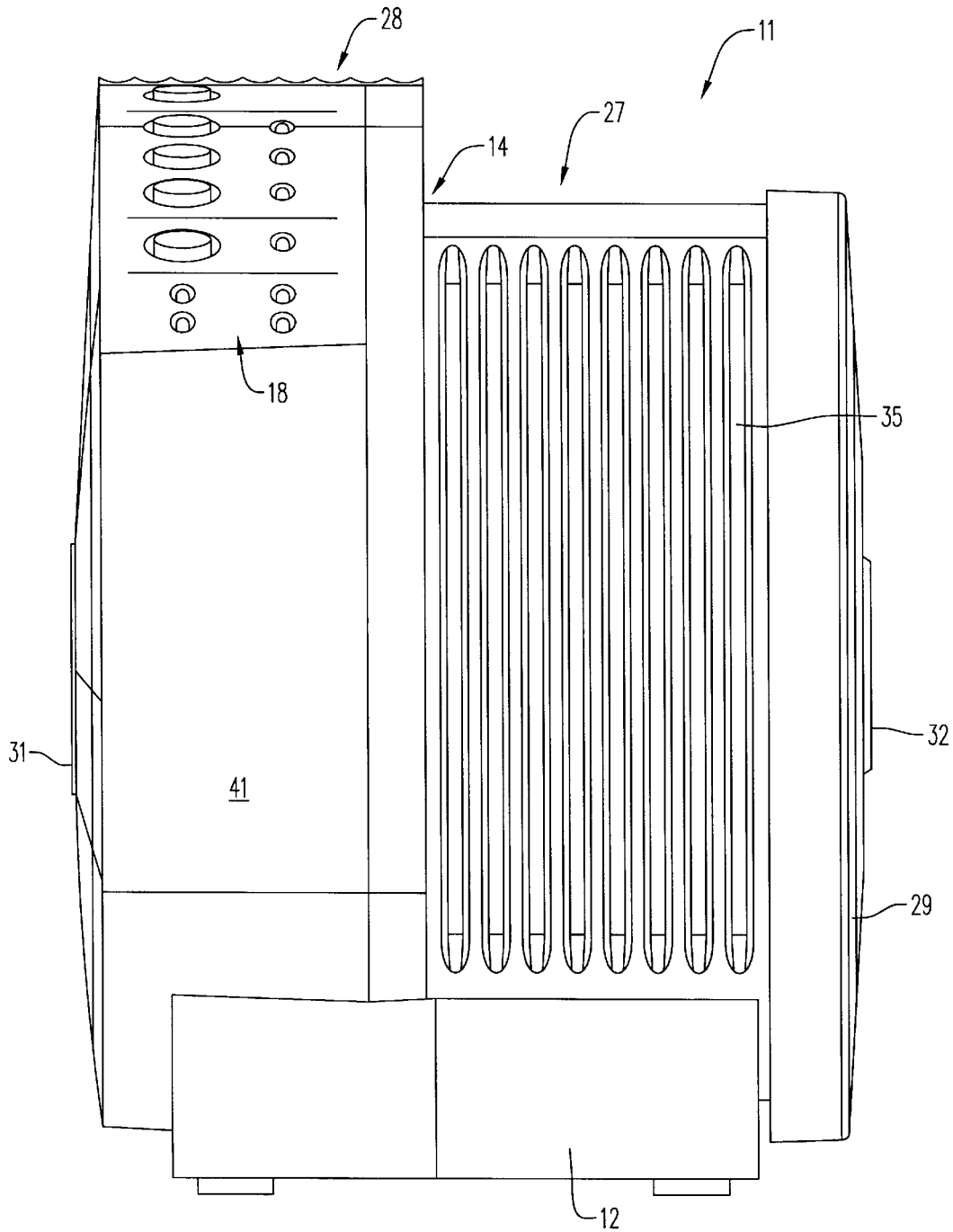
FIG. 2 is a front view of the air purifier shown in FIG. 1.
Figure 3:
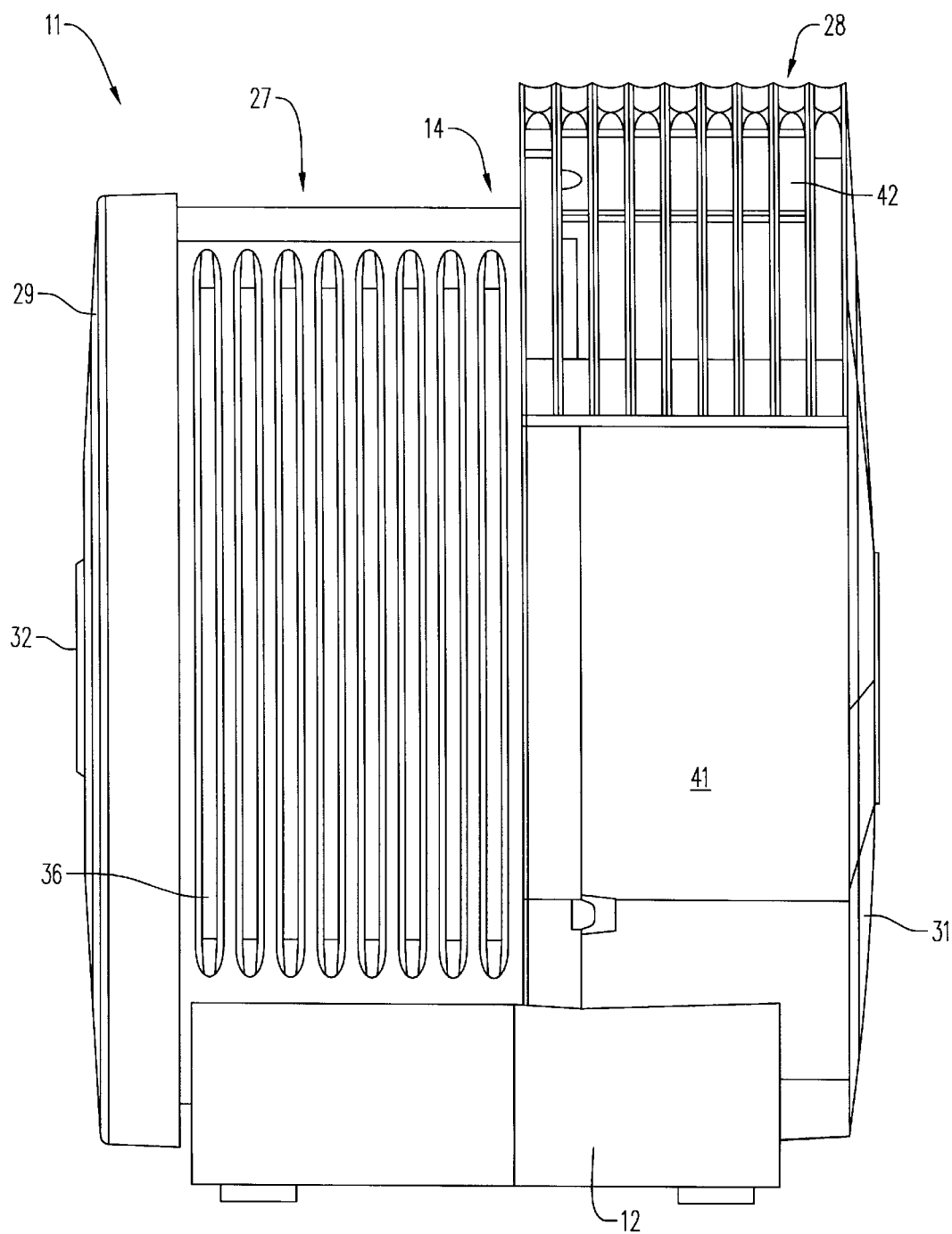
FIG. 3 is a rear view of the air purifier shown in FIG. 1.

A portable air purifier 11 includes a base 12 with a concave top surface 13 and a housing 14 supported thereby as shown in FIGS. 1–4. Also included in the air purifier 11 is a control system 16 (FIG. 4) having a PCB assembly 17, a control panel 18 and a key pad assembly 19 operatively coupled therebetween. An ionizer unit 21 is retained within the housing 14 and electrically connected to the control system 16. Included in the ionizer unit 21 are an ionizer 22, a drive motor capacitor 50 and an ionizer pin assembly 24.

The housing 14 includes an intake section 27 and a discharge section 28 horizontally aligned and straddled by end cover plates 29 and 31. Supported by the end plate 29 is a centrally located locking mechanism 32. The intake section 27 is formed by a semi-circular and concave front inlet grill 35 and a diametrically opposed semi-circular, and concave rear inlet grill 36. Partially defining the discharge section 28 is a semi-cylindrical flange 41 projecting longitudinally from an edge portion of the cover plate 31. Further defining the discharge section 28 are the semi-circularly, concave control panel 18 and a concave outlet grill 42 circumferentially aligned with the projecting flange 41 on the end plate 31.

Figure 4:
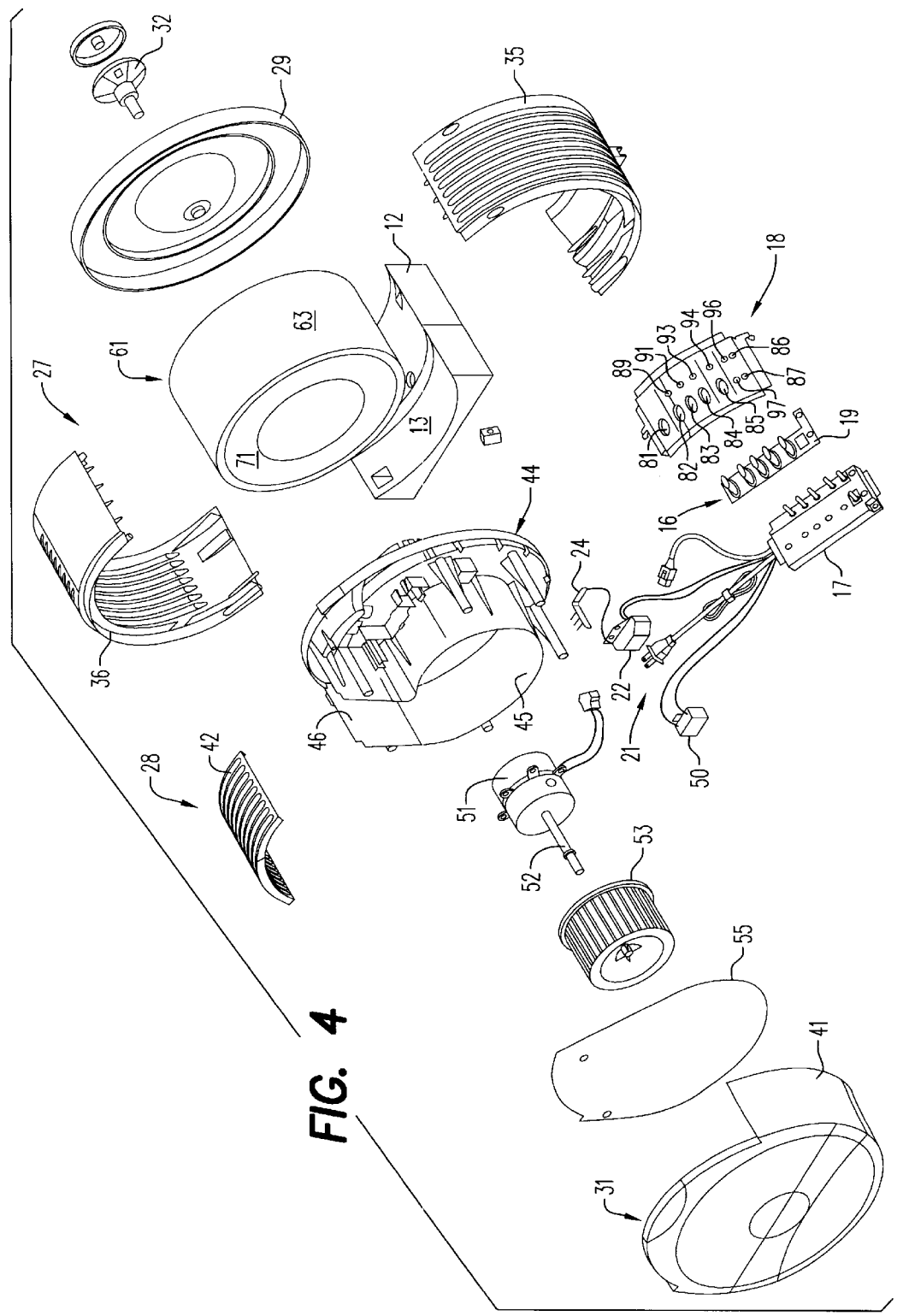
FIG. 4 is an exploded view of the air purifier shown in FIG. 1.

As illustrated in FIG. 4, the discharge section 28 of the housing 14 retains a support member 44 which defines a scroll shaped chamber 45 with an upwardly directed discharge opening 46 communicating with the outlet grill 42. Supported by the support member 44 is a three speed, capacitance drive motor 51 connected for energization by the control system 16. The drive motor 51 has a drive capacitor 50 and a drive shaft 52 rotatably coupled to a centrifugal discharge fan blower 53 centrally disposed in the scroll chamber 45. Covering the scroll chamber 45 is a foam gasket 55.

The intake section 27 of the housing 14 retains a filter cartridge 61 sandwiched between the support member 44 and the end plate 29. Included in the filter cartridge 61 are an inner first filter assembly 62 and an outer second filter 63.

Figure 6:
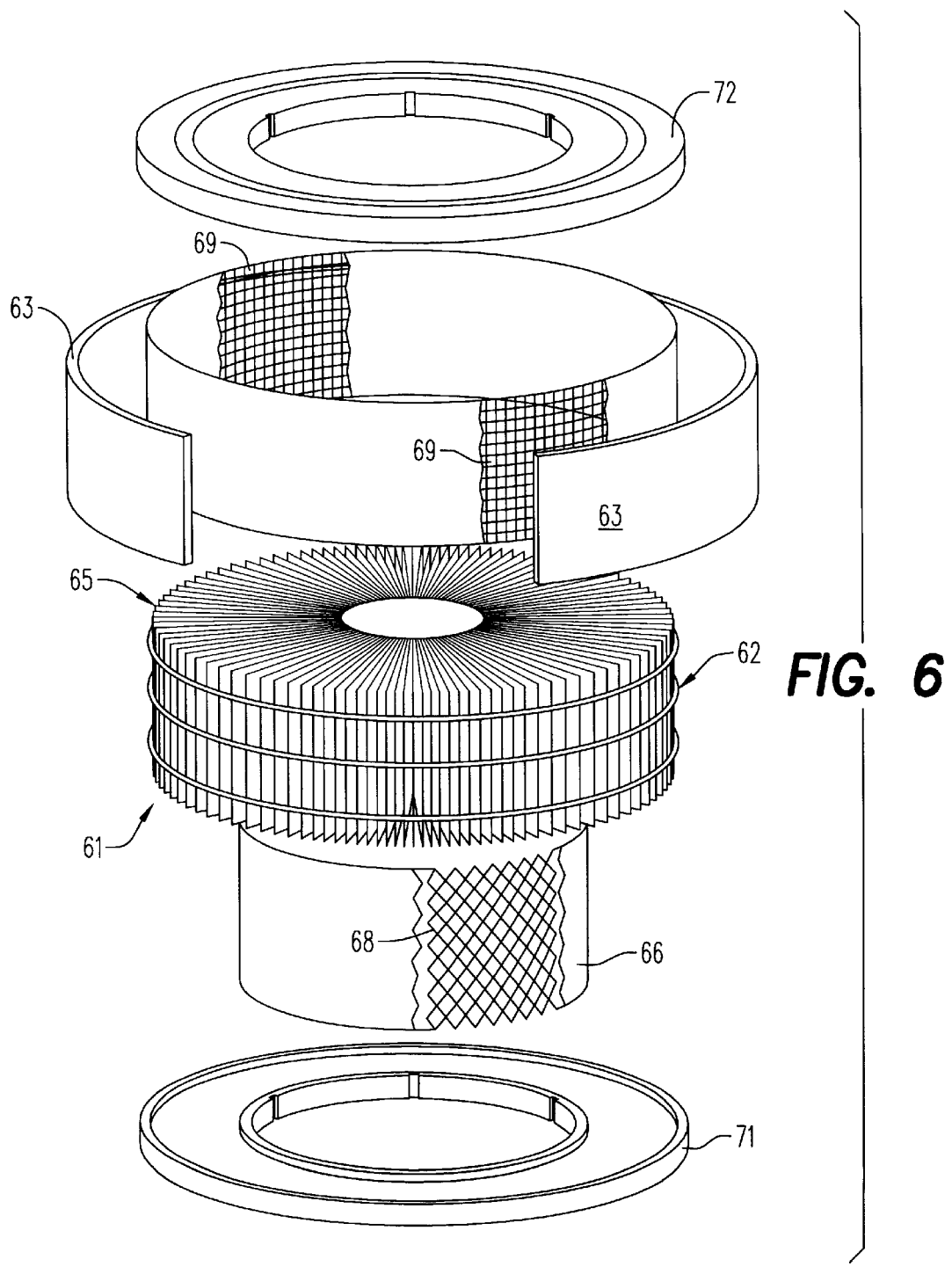
FIG. 6 is an exploded view of a filter cartridge component of the air purifier shown in FIGS. 1–3.

As shown in FIG. 6, the first filter assembly 62 has a corrugated cylindrical HEPA filter media 65 sandwiched between an inner cylindrical retainer 66 and an outer cylindrical retainer 69. Each of the retainers 66 and 69 is formed out of a porous mesh material. Straddling the inner and outer cylindrical retainers 66, 69 are annular end caps 71, 72. The second filter 63 is a soft foam band which is removably positioned over an outer surface of the outer cylindrical retainer 69.

Figure 5:
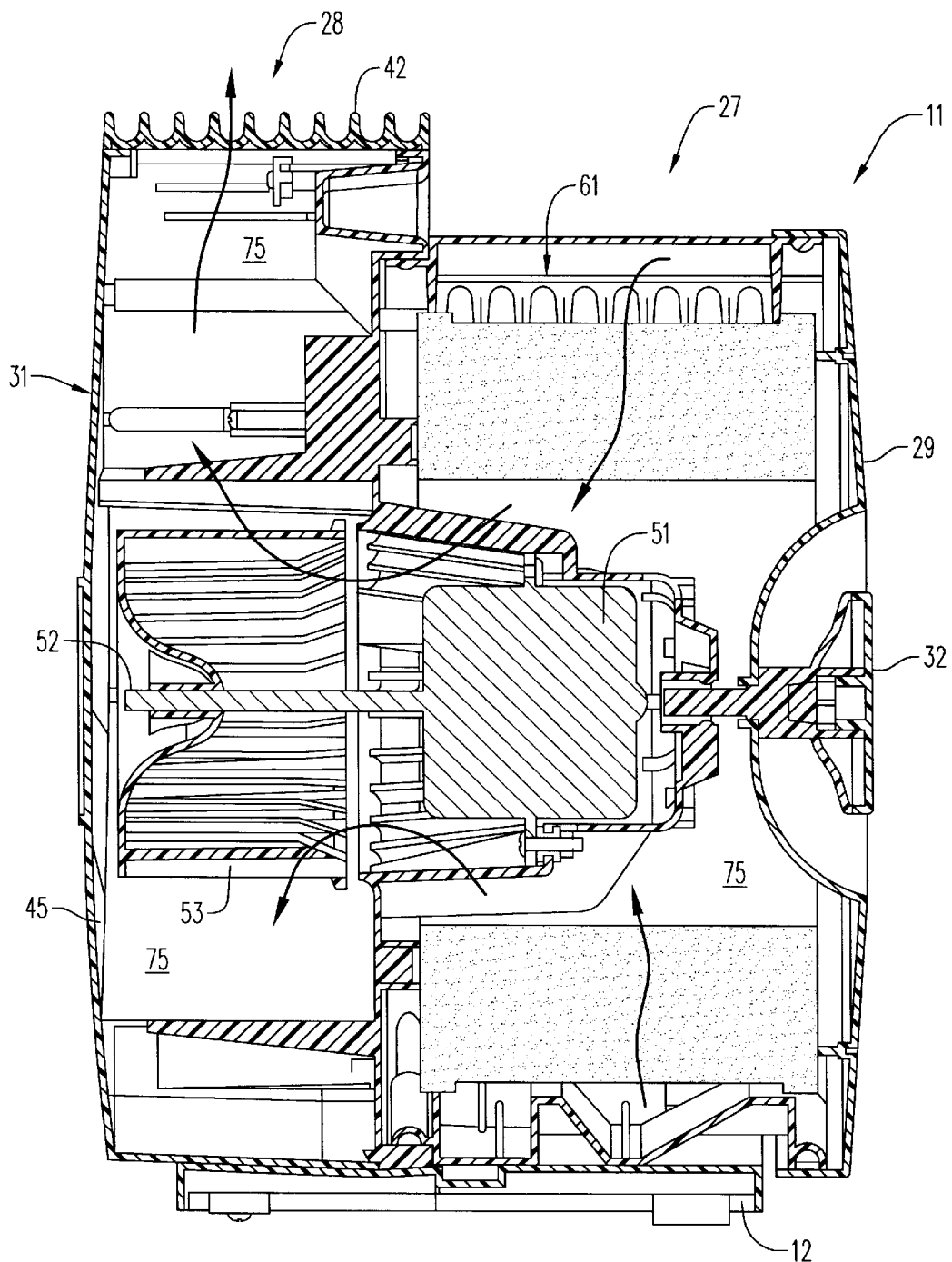
FIG. 5 is a vertical cross-sectional view of the air purifier shown in FIGS. 1–3.

The portable air purifier 11 is assembled as shown in FIG. 5 with conventional fastening mechanisms such as, mated molded couplings and screws (not shown). Defined by the housing 14 is an air flow passage 75 (shown by arrows) extending between the inlet grills 35, 36 of the intake section 27 and the outlet grill 42 of the discharge section 28. Serially arranged in the air flow passage 75 are the first and second filters 62, 63, the centrifugal blower 53 and the scroll chamber 45. Energization of the motor 51 produces rotation of the blower 53 to effect air movement sequentially through the intake grills 35, 36, the second filter 63, the first filter assembly 62, the blower wheel 53, the scroll chamber 45, the scroll discharge opening 46 and the outlet grill 42.

Figure 7:
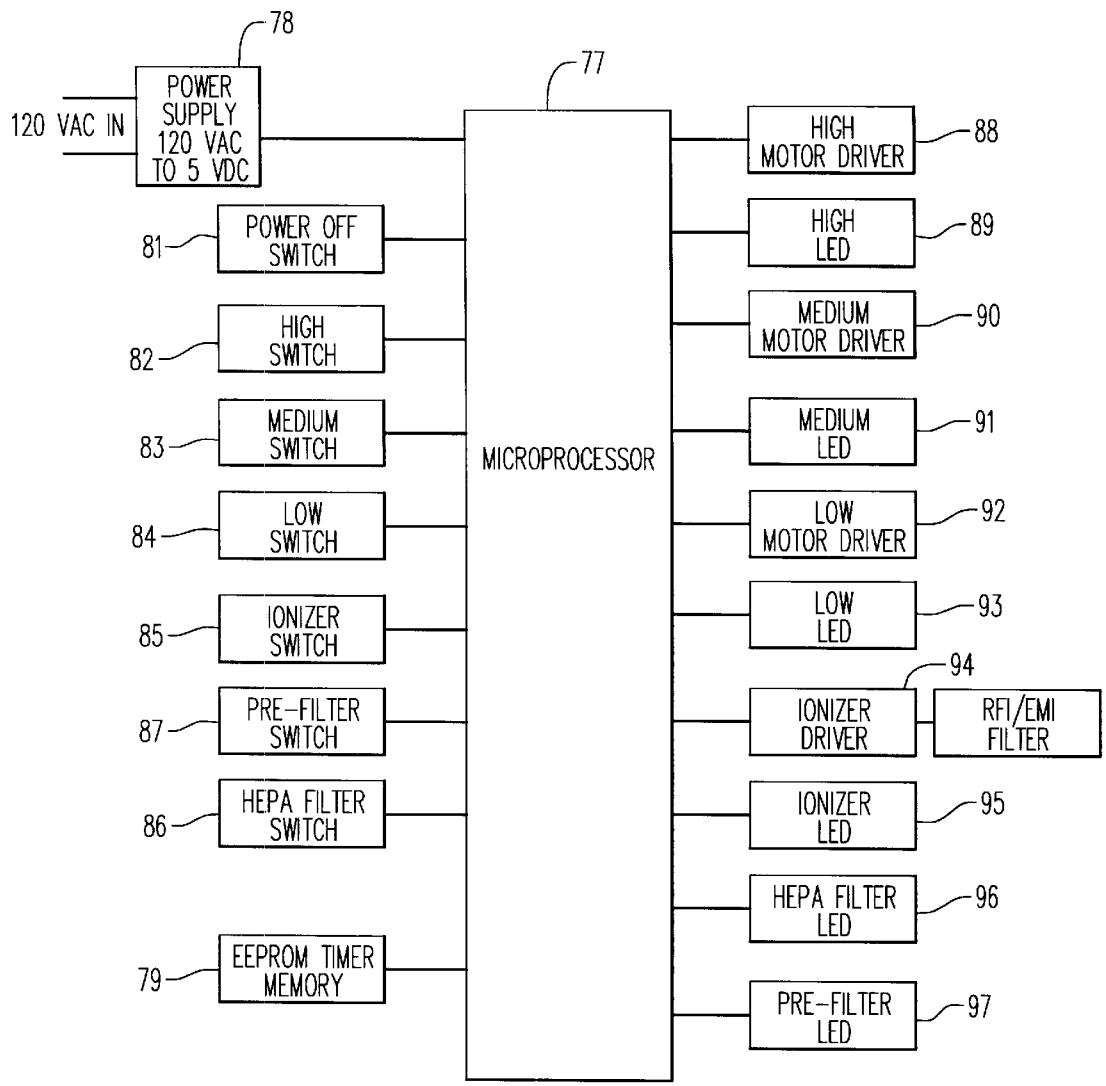
FIG. 7 is a block diagram of a control system for the air purifier shown in FIGS. 1–3.
Figure 8:
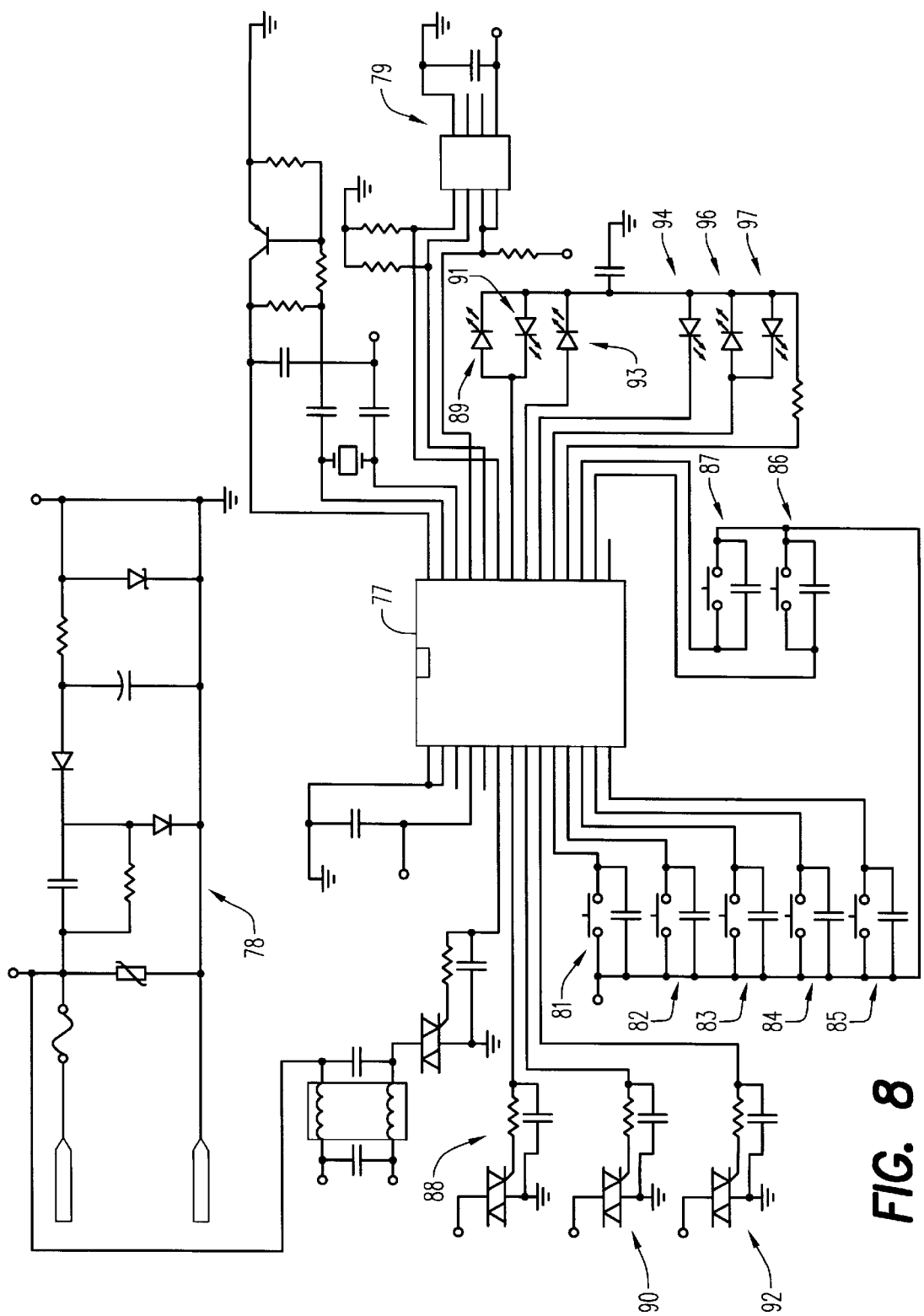
FIG. 8 is a circuit diagram of the control circuit depicted in FIG. 7.

The electrical control system 16 for the air purifier 11 is shown in block diagram form in FIG. 7. A microprocessor 77 is powered by a 120 volt AC to 5 volt DC convertor 78 and generates data retained by an EE ROM timer memory 79. Signal inputs to the microprocessor 77 are provided by a plurality of push button actuator switches 81–87 located on the control panel 18 in the discharge section 28 of the air purifier 11. In response to selected inputs by the actuators 81–87, the microprocessor 77 produces corresponding outputs that energize selectively a plurality of drivers 88–97. Circuit details of the control system 16 are shown in FIG. 8.

Operation of the air purifier 11 is initiated by actuation of any of the speed buttons 82–84 and is terminated by actuation of the off switch 81. In response to actuation of the high speed actuator button 82, the microprocessor energizes the high speed motor driver 88 to produce high speed operation of the motor 51 and blower wheel 53. Similarly, actuation of the medium or low speed actuator buttons 83, 84 produce, respectively, energization of the medium or low speed motor drivers 90 or 92 and either medium or low speed operation of the motor 51 and blower wheel 53. In addition, the microprocessor 77 produces corresponding outputs that energize, respectively, high, medium or low LED drivers to produce illumination of LFD lamps 89, 91 and 93 on the control panel 18. Similarly, actuation of the ionizer button actuator 85 causes the microprocessor 77 to energize the ionizer driver 94 and an ionizer LED driver to produce, respectively, operation of the ionizer 22 and illumination of an ionizer LED lamp 95 in the control panel 18.

As described below, the microprocessor 77 monitors and records elapsed time data during periods in which the blower wheel 53 is activated to produce air flow through the air flow passage 75. In addition, the microprocessor 77 produces indications of recorded elapsed time data by energizing, respectively, either the HEPA first filter LED driver 96 or the prefilter second LED driver 97 in response to given recorded elapsed time data values or actuation of the first or second filter reset button actuators 86, 87 also located on the control panel 18. Energization of LED drivers 96, 97 produces illumination of, respectively, LED lamps 96 or 97 located on the control panel 18.

During operation of the air purifier 11, the first and second filters 62, 63 accumulate dirt particles which consequently are eliminated from the air flow discharged through the outlet grill 42. After a certain period of operation, the filters 62, 63 will become clogged and thereby rendered relatively ineffective. The elapsed time data monitored and recorded by the microprocessor 77 are used to provide an indication of those conditions. However, the rate of filter clogging is dependent not only on the existence of moving air but also on the rate of that air flow through the filters 62, 63. Accordingly, the microprocessor 77 is programmed to variably weight recorded elapsed time data in dependence on the selected rotational speed of the motor 51. When the weighted and recorded elapsed time data reaches one given value corresponding to a projected ineffective condition of the first filter 62, the HEPA driver is energized to produce illumination of the first HEPA LED lamp 96. Similarly, when the weighted and recorded elapsed time data reaches another given value corresponding to a projected ineffective condition of the second filter 63, the prefilter driver is energized to produce illumination of the prefilter LED lamp 97. For example only, the microprocessor 77 can be programmed to accumulate elapsed time data corresponding to actual time with the motor 51 operating at full speed, at 0.8 actual time with the motor operating at medium speed and at 0.6 actual time with the motor 51 operating at low speed. In that manner, an ineffective condition of either of the first or second filters 62, 63 can be more accurately predicted.

Illumination of the first LED lamp 96 in response to one given recorded value of elapsed time data informs a user of the purifier 11 that the HEPA filter media 65 of the first filter assembly 62 (FIG. 6) should be replaced. The one given value can correspond, for example, to a projected 6000 hour original life expectancy for the HEPA filter media 65 with the motor 51 operating at high speed. After replacement of the HEPA filter assembly 62, the user actuates the first filter reset button 86 for an extended period of, for example, 5 seconds to reset a first filter clock portion of the microprocessor 77 and initiate therefor a new period of elapsed time data recording. Similarly, illumination of the second LED lamp 97 in response to another given value of elapsed time data informs a user that the prefilter 63 should be replaced. The another given value can correspond, for example, to a projected 900 hour original life expectancy for the prefilter 63 with the motor 51 operating at high speed. After replacement of the prefilter 63, the user actuates the second filter reset button 87 for an extended period of, for example, 5 seconds to reset a second filter clock portion of the microprocessor 77 and initiate therefor a new period of elapsed time data recording.

The microprocessor 77 is programmed also to provide information regarding projected remaining life of either the first filter 62 or the second filter 63. Such projected remaining life corresponds to a difference between the original life expectancy of the filter and a current recorded value of elapsed time data. For example, assuming an original HEPA filter life expectancy of 6000 hours and a current HEPA filter elapsed time data value of 2000 hours, the microprocessor 77 would calculate a remaining HEPA filter life of 4000 hours. Similarly, assuming an original prefilter life expectancy of 900 hours and a current prefilter elapsed time data value of 300 hours, the microprocessor 77 would calculate a remaining prefilter life of 600 hours.

To obtain a remaining life indication of the HEPA filter assembly 62, a user momentarily actuates the HEPA button 86 for a period less than the 5 second reset period described above. In response to such momentary actuation of the button 86, the microprocessor periodically energizes the HEPA driver to cause periodic illumination of the HEPA lamp 96 a number of times corresponding to the calculated remaining life expectancy. For example, a single flash of the lamp 105 would indicate a ¾ period (4500 hours) of remaining life, two flashes would indicate a ½ period (3000 hours) of remaining life, three flashes would indicate a ¼ period (1500 hours) of remaining life and four flashes would indicate a less than ¼ period remaining before replacement. In the same manner, momentary actuation of the prefilter button 87 would produce periodic illumination of the prefilter LED lamp 97 with the number of flashes indicative of remaining life.

Obviously, many modifications and variations of the present invention are possible in light of the above teachings. For example, the invention can be used for air conditioning systems other than air purifiers and for replaceable conditioning media other than filters. Included in such other systems are humidifiers employing replaceable wick elements. It is to be understood, therefore, that the invention can be practiced otherwise than as specifically described.

What is claimed is:

1. A portable air conditioning system comprising:
    a housing defining an air inlet, an air outlet and an air flow passage extending therebetween;
    air conditioning means disposed to condition air circulating through said flow passage, said air conditioning means comprising a first filter and a second filter arranged in series so as to sequentially filter air circulating through said flow passage;
    fan means retained by said housing and activatable to draw air through said air inlet, move air through said flow passage and said filter, and discharge air through said air outlet;
    electrically powered driver means coupled to said fan means and energizable to provide said activation of said fan means; and
    control means comprising processor means for monitoring and recording elapsed time data during periods in which said fan means is activated to move air, a first elapsed time indicator for indicating one value of elapsed time data for said first filter, and a second elapsed time indicator for indicating another value of elapsed time data for said second filter.

2. An air purifier according to claim 1 wherein said control means further comprises an electrical actuator for energizing said drive means, and said processor means comprises clock means responsive to energization of said drive means to provide said elapsed time data.

3. An air purifier according to claim 2 wherein said reset means comprises a first reset actuator for resetting said elapsed time data for said first filter, and a second reset actuator for resetting said elapsed time data for said second filter.

4. An air purifier according to claim 3 wherein each of said first and second elapsed time indicators is a lamp.

5. An air purifier according to claim 1 wherein said drive means is a multiple speed motor rotatably coupled to said fan means; said control means further comprises a plurality of speed selectors, each operable to select a different speed of said motor; and said recorded elapsed time data is variably dependent on said selected speed of said motor.

6. An air purifier according to claim 5 wherein said control means further comprises an electrical actuator for energizing said drive means, and said processor means comprises clock means responsive to energization of said drive means to provide said elapsed time data.

7. An air purifier according to claim 6 wherein said processor means variably weights said elapsed time data provided by said clock means in dependence on said selected speed of said motor.

8. An air purifier according to claim 7 wherein said processor means records for each of said first and second filters a total elapsed time value equal to the sum of elapsed time periods during which said motor is energized at each said speed, each said elapsed time period being weighted in direct dependence on said motor speed during that time period.

9. An air purifier according to claim 8 wherein said control means further comprises a first elapsed time indicator for indicating one value of elapsed time data for said first filter, and a second elapsed time indicator for indicating another value of elapsed time data for said second filter.

10. An air purifier according to claim 9 wherein said control means further comprises an electrical actuator for energizing said drive means, and said processor means comprises clock means responsive to energization of said drive means to provide said elapsed time data.

11. An air purifier according to claim 10 wherein said reset means comprises a first reset actuator for resetting said elapsed time data for said first filter, and a second reset actuator for resetting said elapsed time data for said second filter.

12. An air purifier according to claim 11 wherein each of said first and second elapsed time indicators is a lamp.

13. An air purifier according to claim 1 wherein said control means further comprises a first remaining life indicator for indicating for said first filter a predetermined time period equal to a difference between a current said value of elapsed time data and an anticipated original effective life expectancy of said first filter, and a second remaining life indicator for indicating for said second filter a predetermined time period equal to a difference between a current said value of elapsed time data and an anticipated original effective life expectancy of said second filter.

14. An air purifier according to claim 13 wherein said control means further comprises an electrical actuator for energizing said drive means, and said processor means comprises clock means responsive to energization of said drive means to provide said elapsed time data.

15. An air purifier according to claim 14 wherein said reset means comprises a first reset actuator for resetting said elapsed time data for said first filter, and a second reset actuator for resetting said elapsed time data for said second filter.

16. An air purifier according to claim 15 wherein each of said first and second elapsed time indicators is a lamp.

17. An air purifier according to claim 16 wherein each of said first and second remaining life indicators is a lamp energized periodically by said processor means a number of times dependent on the length of its said predetermined time period.

18. A portable air conditioning system comprising:

a housing defining an air inlet, an air outlet and an air flow passage extending therebetween;

air conditioning means disposed to condition air circulating through said flow passage, said air conditioning means comprising filter means for filtering air circulating through said flow passage;

fan means retained by said housing and activatable to draw air through said air inlet, move air through said flow passage and said filter, and discharge air through said air outlet;

electrically powered driver means coupled to said fan means and energizable to provide said activation of said fan means; and control means comprising processor means for monitoring and recording elapsed time data during periods in which said fan means is activated to move air, elapsed time indicator means for indicating a given value of said elapsed time data, and remaining life indicator means for indicating a predetermined time period equal to a difference between a current said value of said elapsed time data and an anticipated original effective life expectancy of said filter means.

19. An air purifier according to claim 18 wherein said control means further comprises an electrical actuator for energizing said drive means, and said processor means comprises clock means responsive to energization of said drive means to provide said elapsed time data.

20. An air purifier according to claim 19 wherein said control means further comprises reset means for resetting said clock means.

21. An air purifier according to claim 20 wherein said elapsed time indicator means is a lamp energized by said processor means in response to said given value of elapsed time data.

22. An air purifier according to claim 21 wherein said remaining life indicator means is a lamp energized periodically by said processor means a number of times dependent on the length of said predetermined time period.

* * * * *